W. G. PRICE.
GRAVITY CARRIER.
APPLICATION FILED APR. 12, 1920.
1,399,318.
Patented Dec. 6, 1921.
2 SHEETS—SHEET 1.
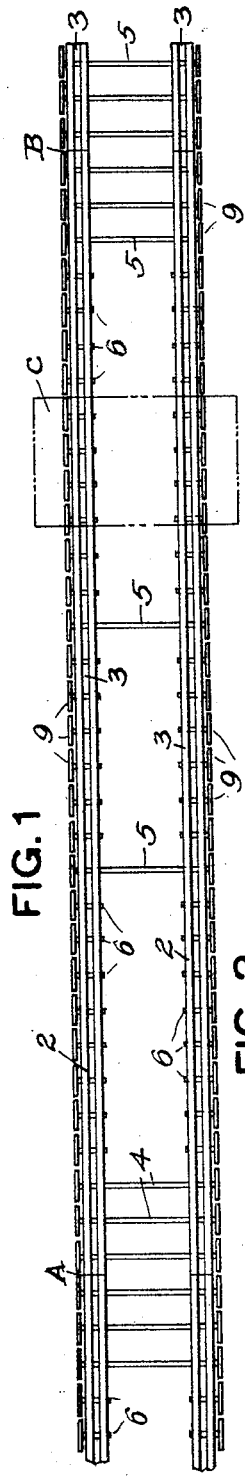
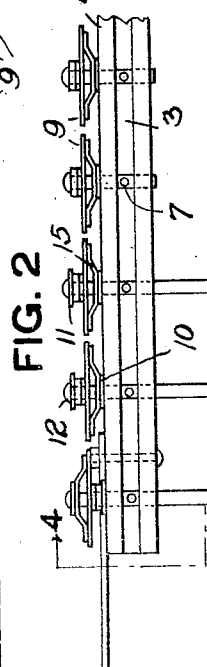
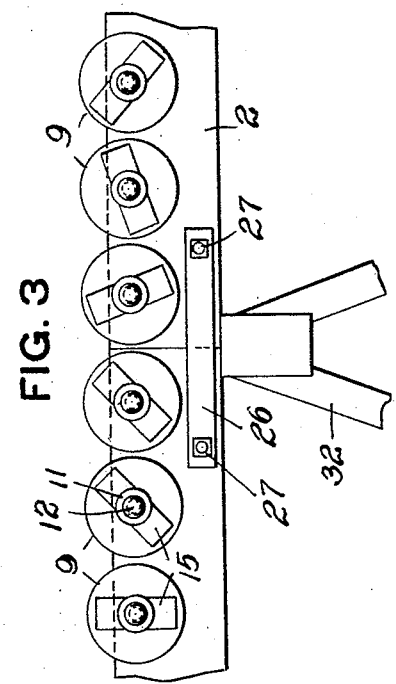
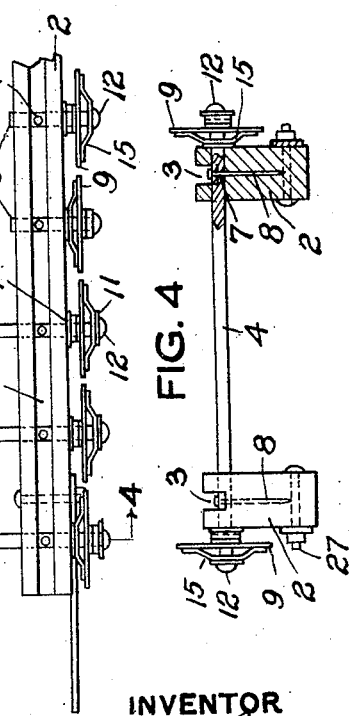
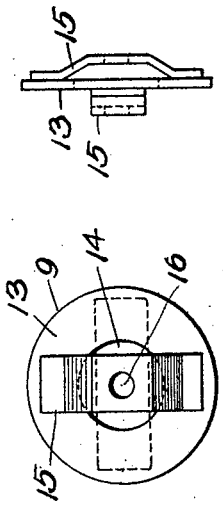
INVENTOR
William G. Price.
By Kay & Totten,
Attorneys

W. G. PRICE.
GRAVITY CARRIER.
APPLICATION FILED APR. 12, 1920.

1,399,318.

Patented Dec. 6, 1921.
2 SHEETS—SHEET 2.

INVENTOR
William G. Price,
By Kay & Totten,
Attorneys

UNITED STATES PATENT OFFICE.

WILLIAM G. PRICE, OF YAKIMA, WASHINGTON.

GRAVITY-CARRIER.

1,399,318.  Specification of Letters Patent.  Patented Dec. 6, 1921.

Application filed April 12, 1920. Serial No. 373,240.

*To all whom it may concern:*

Be it known that I, WILLIAM G. PRICE, a citizen of the United States, and resident of Yakima, in the county of Yakima and State of Washington, have invented a new and useful Improvement in Gravity-Carriers; and I do hereby declare the following to be a full, clear, and exact description thereof.

My invention relates to gravity carriers for transporting packages from place to place, and it has for its object to provide an efficient portable carrier which shall be of light weight, easy for one man to handle, simple in design, and of inexpensive construction.

Figure 7:
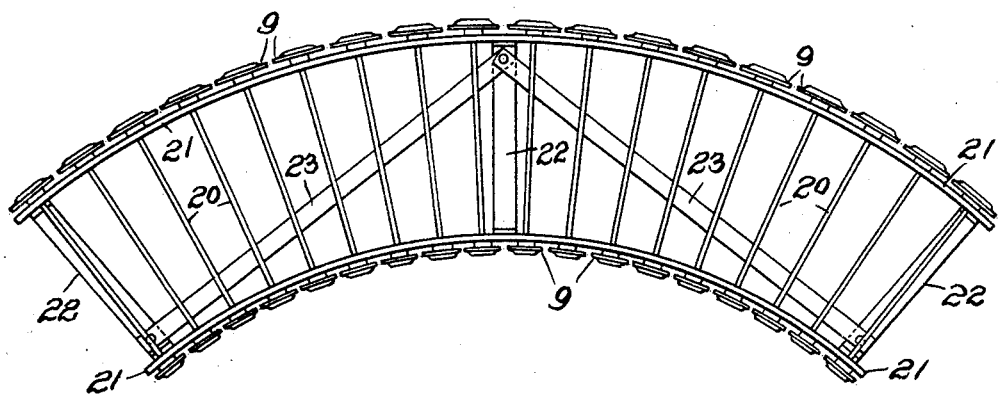
Figure 8:
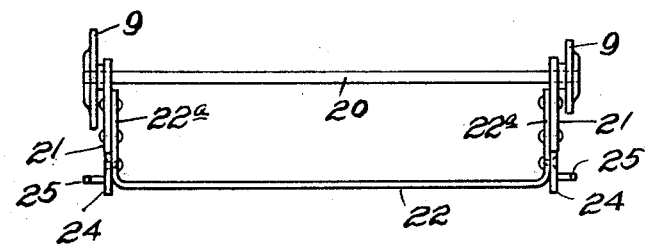
Figure 9:
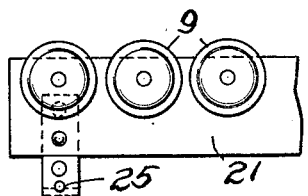
Figure 10:
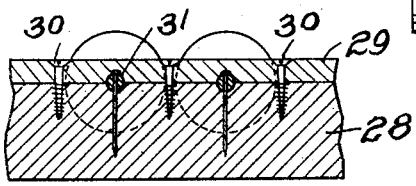
Figure 11:
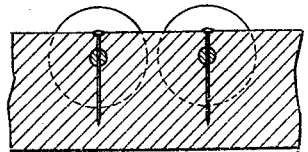

In the accompanying drawings, Figure 1 is a plan view of a straight portion of a carrier constructed in accordance with my invention; Fig. 2 is an enlarged plan view of a portion of one of the sections composing the carrier of Fig. 1; Fig. 3 is a side elevational view showing two sections of the carrier coupled together and resting upon a support. Fig. 4 is a transverse sectional view taken substantially along the line 4—4, Fig. 2; Fig. 5 is a side elevational view of one of the carrier wheels; Fig. 6 is an edge view of the wheel shown in Fig. 5; Fig. 7 is a plan view of a curved carrier section; Fig. 8 is an end elevational view of the section shown in Fig. 7; Fig. 9 is a side elevational view of one end of the curved section shown in Fig. 7; and Figs. 10 and 11 are fragmentary vertical sectional views showing modified forms of construction.

Referring first to Figs. 1 to 6 of the drawing, the carrier is preferably made in sections, one of which, for example, extends from A to B, Fig. 1. Each section is composed of wooden side bars 2 each of which may be provided with a longitudinal groove 3 and with transverse holes for receiving end bars 4, intermediate bars 5, and a series of short bars 6. The bars 4, 5 and 6 are all made to have a driving fit in the holes in the side pieces 2, and are provided with vertical holes 7 through which nails 8 are driven to fasten the bars 4, 5 and 6 securely to the side pieces. As best shown in Fig. 4, the holes 7 and the nails 8 are so disposed that the heads of the nails are within the grooves 3. The grooves 3 may be omitted if desired, in which case the nails 8 are driven down through the holes 7 from the tops of the side pieces, as shown in Fig. 11.

All of the bars 4, 5 and 6 carry idler wheels 9 which are all constructed in the same manner but which differ in the means by which they are attached to their supporting bars. The wheels carried by the bars 4 and 5 are each provided with a washer 10 next to the side piece 2, and with a washer 11 on the outside of the wheel next to the upset or riveted end 12 of the bar, while in the case of the wheels carried by the short bars 6 the outer washer 11 is omitted and the wheel is held in place between the inner washer 10 and the upset outer end 12 of the bar. All of the wheels fit loosely upon their supporting bars and revolve freely when conveying a package, such as a box C, shown on Fig. 1.

A sufficient number of bars 4 are used at each end of the carrier sections to insure a rigid construction, and the intermediate transverse bars 5 are provided as hand-holds for carrying the sections from place to place.

Each of the wheels 9 is composed of an annular disk 13 having a large central hole 14 and two straps or spokes 15 which, as best shown in Figs. 5 and 6, are secured to opposite sides of the disk 13 and are preferably electrically welded to the disk at their ends. Instead of being welded to the disk, the spokes 15 may be attached by means of rivets or otherwise. Each of the spokes 15 has a central hole 16, and has its central portion bent out from the disk 13 to provide a wide bearing on the supporting bar in order that the wheel may turn true.

The curved section shown in Figs. 7, 8 and 9 differs from that already described in that all of the wheels are supported by radial bars 20 and are preferably brazed or otherwise firmly secured to the outer ends of these bars. The bars 20 therefore constitute shafts for the wheels 9 and turn freely in openings formed in curved side pieces 21 which are preferably composed of sheet metal.

The wheels on the outside of the curve are larger than the wheels on the inside of the curve and the two wheels 9 on one bar or shaft 20 are of such size as to form sections of a cone which has its apex at the center of curvature of the side pieces 21. The side pieces 21 are connected by means of transverse bars 22 and are braced by means of diagonal bars 23.

Fig. 8 shows the construction at the end of the curved section shown in Fig. 7, the transverse bar 22 being of U-shape and having its vertical ends 22ª riveted or otherwise secured to the side pieces 21.

The transverse bars 22 also carry short depending plates 24 for carrying lug pins 25, which are provided for the purpose of connecting the curved carrier sections to the straight sections such as are described above in connection with Figs. 1 to 4. This connection, as well as the connection between successive straight sections, is made by means of perforated coupling bars 26, one of which is shown in Fig. 3. When connecting straight sections, the coupling bars 26 are secured to the side pieces 2 by means of bolts 27 that extend through the side pieces 2, as shown in Fig. 4.

Fig. 10 shows a modified construction which may be employed. In this form, each of the side pieces 28 has a cap 29 which is screwed to the side piece by means of screws 30, and holes 31 are then bored through the side pieces, these holes extending partly through the side pieces and partly through the caps. The caps are then removed, and bars and wheels, such, for example as the bars and wheels shown in Figs. 1 to 6, are nailed in place, and the caps replaced and screwed down.

In use, the carrier is assembled by taking a suitable number of straight and curved sections, according to the length and shape of the path over which the articles are to be carried, coupling the sections end to end, and resting them upon supports at suitable intervals and with the required inclination. Such a support is indicated at 32, Fig. 3. The conical principle on which the curved sections are constructed enables the boxes or other packages to be carried from one straight carrier to another straight carrier on the curved section without permitting the box to turn around out of its carrying position or to run off the carrier.

While I have herein shown and described an effective and preferred embodiment of my invention, it is to be understood that numerous changes in the form and arrangement of parts may readily be made. I therefore desire that no limitations be imposed upon my invention except such as are indicated in the appended claims.

What I claim is:

1. A wheel for gravity carriers comprising an annular disk, and a plurality of flat spoke members extending diametrally across the said disk and having their ends connected thereto.

2. A wheel for gravity carriers comprising an annular metal disk, flat spoke members of metal extending diametrally across the said disk and having their ends connected thereto.

3. A wheel for gravity carriers comprising an annular metal disk and flat metal spoke members extending diametrally across the said disk and having their ends connected thereto, the central portions of the said spoke members being bowed outwardly to provide a wide bearing surface and being provided with bearing openings at the center of the said disk.

4. A wheel for gravity carriers comprising an annular metal disk, and a flat metal spoke member secured to each side of the said disk, the said spoke members being disposed at right angles to each other and being rigidly secured to the said disk at their ends.

5. A wheel for gravity carriers comprising an annular metal disk, a flat metal spoke member secured to each side of the said disk, the two spoke members being disposed at right angles to each other and extending diametrally across the said disk, each of the said spoke members being bowed outwardly to provide a wide bearing surface and being provided with a bearing opening at the center of the said disk.

In testimony whereof I, the said WILLIAM G. PRICE, have hereunto set my hand.

WILLIAM G. PRICE.

Witnesses:
CARRIE GROSENBAUGH,
MYRTIE M. SLASOR.